United States Patent [19]

Nagy

[11] 4,143,615

[45] Mar. 13, 1979

[54] ACCELERATION INDICATOR

[75] Inventor: Ernest J. Nagy, Munster, Ind.

[73] Assignee: Pullman Incorporated, Chicago, Ill.

[21] Appl. No.: 895,893

[22] Filed: Apr. 13, 1978

[51] Int. Cl.² ............................................. G01P 15/00
[52] U.S. Cl. ......................................... 116/46; 73/492;
105/1 A; 116/203
[58] Field of Search ............ 116/114 AH, 46; 73/514,
73/492

[56] References Cited

U.S. PATENT DOCUMENTS

| | | | |
|---|---|---|---|
| 3,145,571 | 8/1964 | Maynard et al. | 73/492 |
| 3,418,964 | 12/1968 | Peterson | 116/114 AH |
| 3,581,577 | 6/1971 | Ray, Jr. | 73/492 |

*Primary Examiner*—Daniel M. Yasich
*Attorney, Agent, or Firm*—Thomas G. Anderson

[57] ABSTRACT

An acceleration indicator including an anti-tampering arrangement adapted to be secured to a railway freight car for detecting pre-selected destructive impacts on the the car. The indicator includes a generally hat-shaped casing having a normally obscured movable plate or flag carried therewithin by a spring biased pendulum supported on a vertical plate secured within the casing. The vertical plate also supports the anti-tampering arrangement such that when the indicator is subjected to a preselected impact, the pendulum swings clear of the flag and drops by gravity into a position where it can be observed whereat it is entrapped by the anti-tampering arrangement.

6 Claims, 5 Drawing Figures

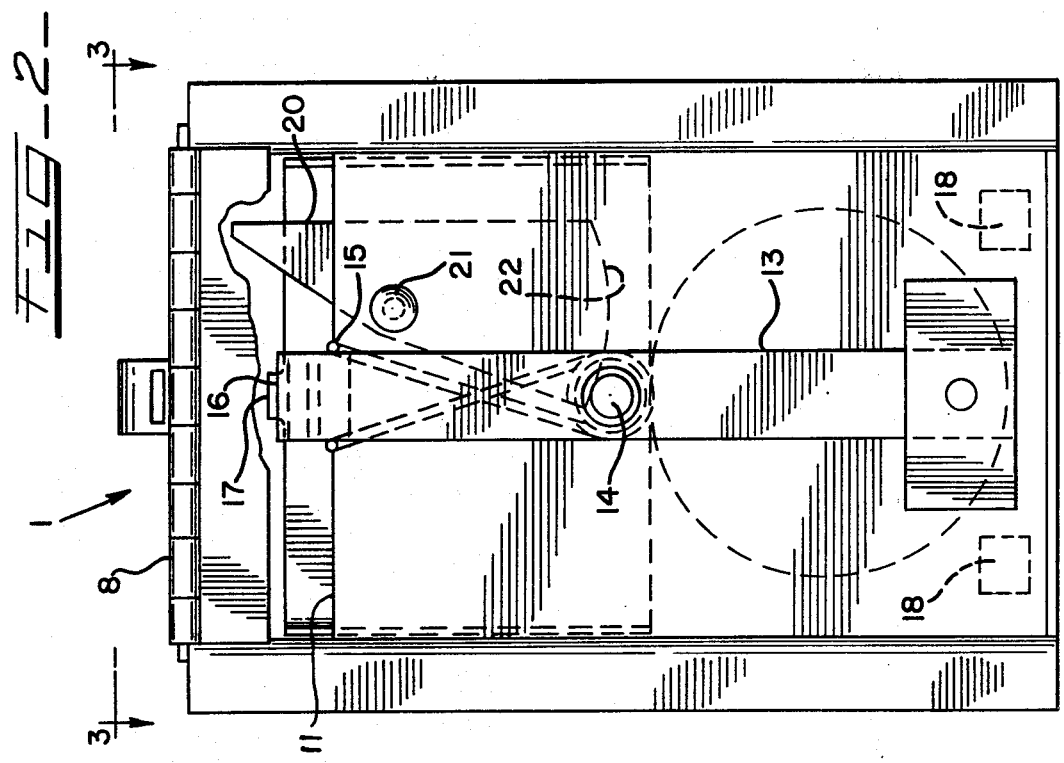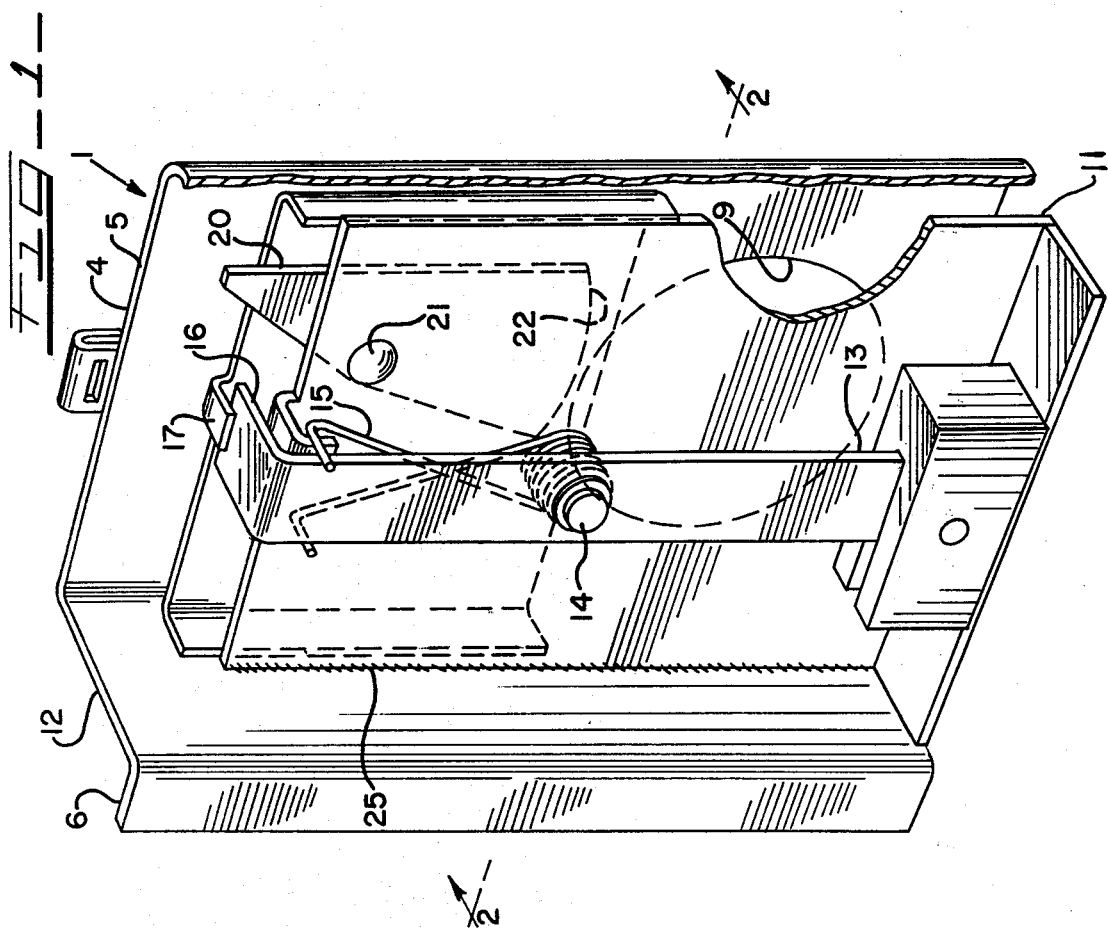

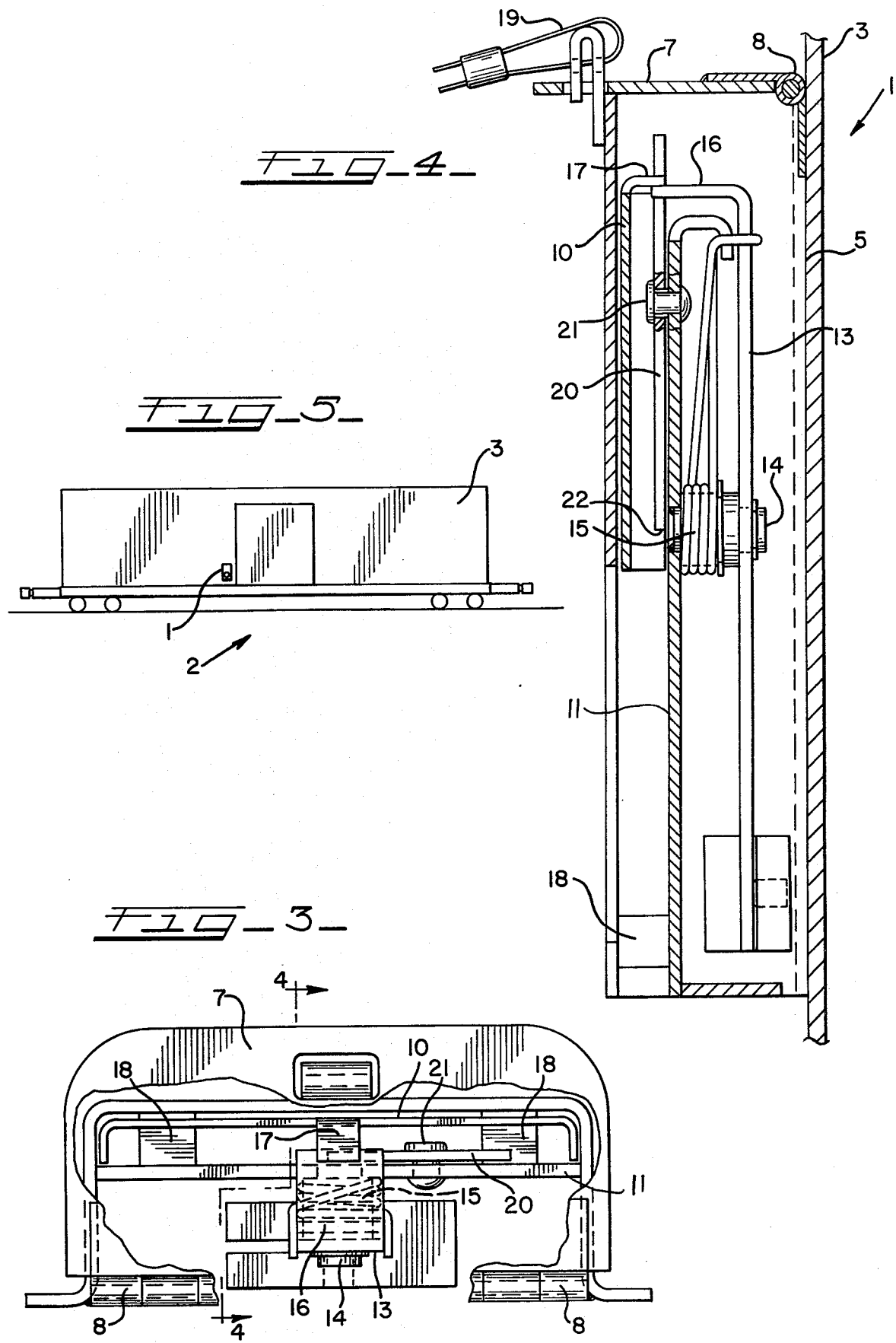

ACCELERATION INDICATOR

BACKGROUND OF THE INVENTION

1. Field of the Invention

The present invention relates to an indicating device for detecting pre-determined excessive impacts on a cargo box or body of a railway boxcar and thus the cargo carried therein.

2. Description of the Prior Art

The prior art is exemplified by U.S. Pat. Nos. 2,839,022; 3,145,571; 3,418,964 and 3,512,498. The present invention is an improvement over these constructions.

SUMMARY OF THE INVENTION

The present invention relates to a device for detecting destructive impacts on cargo carried within the cargo box or body of a railway boxcar resulting from failure of the car cushioning devices or excessive speeds during car marshalling operations or the like. The indicated device includes a housing or casing having a aperture or window in its lower end and mountable on the side wall of a boxcar. A vertically movable plate or flag is carried within the casing in a normally obscured position above the opening; however, when the cargo body or box is subjected to a pre-determined excessive impact or acceleration, a spring biased pendulum pivotally supported on a vertical plate mounted within the casing and supporting the flag in the raised and obscured position, swings clear of the flag, thereby allowing it to drop by gravity into a position covering the window where it may be easily observed by a cargo inspector at a freight receiving terminal. An anti-tampering arrangement is also provided for the device comprising an eccentrically supported anti-tampering plate which is pivotally mounted on the same vertical plate as the spring biased pendulum, thus essentially obviating the possibility of lateral misalignment and malfunction of the anti-tampering arrangement due to improper assembly or jimmying of the device.

BRIEF DESCRIPTION OF THE DRAWINGS

FIG. 1 is a partial perspective view of the indicating device;

FIG. 2 is an elevational view of the indicating device looking outward from the car wall;

FIG. 3 is a plan sectional view taken generally along line 3—3 in FIG. 2;

FIG. 4 is an elevational view taken generally along line 4—4 in FIG. 3; and

FIG. 5 is a side elevational view of a boxcar showing the indicating device applied to the side wall of the car.

DESCRIPTION OF THE PREFERRED EMBODIMENT

Turning now to consideration of the drawings and in particular FIGS. 1 and 5, the indicating device 1 is mounted on the side wall of a railway boxcar 2 to detect excessive impacts on the box or cargo body 3 of the car resulting from failure of the car cushioning device or the like.

The indicating device 1 includes an outer housing or casing 4 generally hat-shaped in cross section and having an outer casing wall 5 and brim-like flanges 6 which are adapted to be secured to the side wall of the car by welding or other appropriate means and a hinged lid 7 mounted on a rod or hinge arrangement 8 extending between the flanges 6 and having a locking or sealing arrangement 19. An aperture or window 9 is provided in the lower portion of the outer casing wall 5 through which a movable plate or flag 10 may be seen when the flag actuating or detecting mechanism of the device is actuated to indicate excessive impacts as hereinafter disclosed.

The flag actuating mechanism includes a vertical mounting or support plate 11 spaced from the outer casing wall to accommodate vertical sliding movement of the flag 10 therebetween and secured to the side walls 12 of the casing by welding w or the like as generally shown in the drawings. A pendulum 13 having a vertical arm is pivotally mounted on the inward face of the plate 11 on a first pivot stud 14 secured thereto and having a torsion spring 15 sandwiched therebetween to bias the pendulum 13 against swinging movement below a pre-determined impact on the device. Thus, at acceptable pre-determined impacts, an outwardly extending tab or retainer 16 on the upper end of the pendulum will supportingly engage an inwardly extending tab or stop 17 on the upper portion of the flag 10 and thereby support the flag above the aperture or window 9 to indicate that the cargo has not been subjected to excessive or damaging impacts. Conversely, when the cargo body or box is subjected to excessive impacts, the pendulum will swing clear of the flag tab 17 and the flag 10 will fall onto the blocks 18 in full view of an inspector at the freight receiving terminal through the window opening 9.

The present invention specifically contemplates an easily fabricated anti-tampering arrangement for the device to prevent jimmying or resetting of the device without detectively breaking the sealing arrangement 19. The arrangement provides for an eccentrically balanced triangular locking or anti-tampering plate 20 pivotally mounted on the vertical plate 11 by a second pivot stud or rivet 21 laterally offset from the tab 17 of the flag 10. As illustrated in FIG. 4, the lower edge portion 22 of the plate 20, obstructs upward movement or resetting of the flag 10 without rotating it out of the way after breaking the seal 19 and gaining access to it through the opening in the top of the casing. It should be particularly noted that both the pendulum 13 and locking or anti-tampering plate 20 are pivotally mounted on the vertical plate 11, thus essentially obviating the possibility of lateral misalignment between the lower edge portion 22 of the locking plate 20 and the tab 17 of the flag 10 due to improper assembly or jimmying of the device.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. For a railway freight car, an improved warning device for indicating the presence of excessive acceleration applied to the car to which the device is adapted to be affixed, comprising;

a housing having an outer plate portion and laterally spaced side walls extending inwardly therefrom and adapted to be affixed to the car, a vertical mounting plate extending substantially the length within said housing and inwardly spaced from said outer plate portion and extending between and attached with said side walls in order to reinforce the housing, first and second pivot means being mounted on said vertical plate and extending in opposite directions therefrom, the axis of said second pivot means being spaced vertically above said first pivot means, a pendulum having a vertical arm pivotally carried by said first pivot means on one side of the vertical mounting plate intermediate the upper and lower ends of the arm, biasing means fixed relatively to said first pivot means connected with said pendulum and resiliently resisting swinging movement of the pendulum at accelerations below a pre-determined magnitude, and retainer means at the upper end of said arm, an indicating plate between said vertical mounting plate and outer plate portion and guided thereby in vertical movement between a raised position and a lowered position under the influence of gravity, stop means on said indicating plate cooperative with said retainer means to support it in the raised position when the pendulum is in a substantially vertical position and disengaged therefrom when the pendulum swings against the force of the biasing means to free the indicating plate to drop into the lowered position indicating that excessive acceleration has occurred, and an eccentrically mounted anti-tampering plate being, mounted on the other side of the vertical mounting plate on said second pivot means for swinging movement in a vertical plane and having a lower portion positioned below said stop means in the raised position of the indicating plate and being engageable with the stop means and rotated thereby as the indicating plate drops into its lowered position, and said lower portion overlying said stop means when the indicating plate is in its lowered position, thereby preventing return of the indicating means to the raised position until said anti-tampering plate is pivoted out of the path of movement of said stop means.

2. The invention in accordance with claim 1, and
said outer plate having an aperture through its lower end to view the indicating plate in its lowered position.

3. The invention in accordance with claim 1, and
said biasing means being mounted on said first pivot means between the vertical mounting plate and the vertical arm of the pendulum for retaining the biasing means and said vertical arm being engageable with the biasing means for limiting pivotal movement of said pendulum arm.

4. The invention in accordance with claim 3, and
said biasing means being spring means.

5. The invention in accordance with claim 1, and
said eccentrically mounted anti-tampering plate being of a generally triangular configuration.

6. The invention in accordance with claim 1, and
said indicating plate having inwardly extending flange portions slidingly engageable against said vertical plate thereby maintaining said plate in spaced relation therefrom.

* * * * *